US012794322B2

(12) United States Patent
Kawasaki et al.

(10) Patent No.: US 12,794,322 B2
(45) Date of Patent: Nov. 10, 2026

(54) ELECTRIC MOTOR, AND METHOD OF PRODUCING THE ELECTRIC MOTOR

(71) Applicant: Mitsubishi Electric Corporation, Tokyo (JP)

(72) Inventors: Sachiko Kawasaki, Tokyo (JP); Yasuhiro Motonishi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 182 days.

(21) Appl. No.: 18/861,596

(22) PCT Filed: Jun. 6, 2022

(86) PCT No.: PCT/JP2022/022705
§ 371 (c)(1),
(2) Date: Oct. 30, 2024

(87) PCT Pub. No.: WO2023/238170
PCT Pub. Date: Dec. 14, 2023

(65) Prior Publication Data
US 2025/0343473 A1 Nov. 6, 2025

(51) Int. Cl.
*H02K 11/21* (2016.01)
*H02K 1/2706* (2022.01)
*H02K 15/021* (2025.01)

(52) U.S. Cl.
CPC .......... *H02K 11/21* (2016.01); *H02K 1/2706* (2013.01); *H02K 15/021* (2025.01)

(58) Field of Classification Search
CPC .... H02K 11/21; H02K 15/021; H02K 1/2706; H02K 2203/06
USPC .......... 310/68 B
See application file for complete search history.

(56) References Cited

U.S. PATENT DOCUMENTS 6,246,142 B1 6/2001 Asao et al.
6,777,850 B2 * 8/2004 Harada .......... H02K 1/16 310/254.1
10,461,608 B2 * 10/2019 Fukushima .......... H02K 11/21
(Continued)

FOREIGN PATENT DOCUMENTS

JP 2000-278892 A 10/2000
JP 2011-223704 A 11/2011
(Continued)

OTHER PUBLICATIONS

International Search Report and Written Opinion mailed on Aug. 16, 2022, received for PCT Application PCT/JP2022/022705, filed on Jun. 6, 2022, 9 pages including English Translation.

*Primary Examiner* — Burton S Mullins
(74) *Attorney, Agent, or Firm* — XSENSUS LLP

(57) ABSTRACT

An electric motor includes: a rotor to rotate about an axis-of-rotation line; a stator placed outside the rotor in a radial direction of the rotor, and having multiple metal plates which are piled up in a direction of the axis-of-rotation line and which include a first metal plate and a second metal plate; and a conductive part pair including a first conductive part placed on an outer surface of the stator, having conductivity, and connecting the first and second metal plates, and a second conductive part placed at a position different from that of the first conductive part on the outer surface of the stator, having conductivity, and connecting the first and second metal plates.

18 Claims, 6 Drawing Sheets

(56) References Cited

U.S. PATENT DOCUMENTS

| | | | | |
|---|---|---|---|---|
| 2011/0248598 | A1 | 10/2011 | Utaka | |
| 2019/0109500 | A1* | 4/2019 | Akatsuka | H02K 1/18 |

FOREIGN PATENT DOCUMENTS

| | | | |
|---|---|---|---|
| JP | 2017-169296 | A | 9/2017 |
| JP | 2020-167897 | A | 10/2020 |

* cited by examiner

ELECTRIC MOTOR, AND METHOD OF PRODUCING THE ELECTRIC MOTOR

CROSS-REFERENCE TO RELATED APPLICATION

This application is a national stage application, pursuant to 35 U.S.C. § 371, of International Patent Application No. PCT/JP2022/022705, filed Jun. 6, 2022, the entire contents of which are incorporated herein by reference.

TECHNICAL FIELD

The present disclosure relates to an electric motor, and a method of producing the electric motor.

BACKGROUND ART

Conventionally, a motor including: a shaft to rotate; a rotor fixed to a shaft; a stator placed outside the rotor in a radial direction of the rotor; and a rotational angle sensor to detect the angle of rotation of the rotor is disclosed (refer to Patent Literature 1). This motor is placed in such a way that a wire extending from the rotational angle sensor passes in a vicinity on the outside in the radial direction of the stator.

CITATION LIST

Patent Literature

Patent Literature 1: JP 2020-167897 A

SUMMARY OF INVENTION

Technical Problem

Generally, when the rotor of the electric motor rotates, a leakage magnetic flux leaking out to outside the motor occurs from the stator. The leakage magnetic flux of the stator may change dependently on a change in a current supplied to the motor. The current supplied to the motor changes at times of switching of the energization of the magnetic poles of the motor, a start-up of the motor, and a stop of the motor, for example. A problem is that, for example, in the case where an electric wire is placed in a vicinity on the outside in the radial direction of the stator, when the leakage magnetic flux of the stator changes, a noise occurs in the electric wire because of a counter electromotive voltage applied to the electric wire.

The present disclosure is made to solve the above-mentioned problem, and it is an object of the present disclosure to provide an electric motor that can reduce the influence of a leakage magnetic flux, and a method of producing the electric motor.

Solution to Problem

An electric motor according to the present disclosure includes: a rotor to rotate about an axis-of-rotation line; a stator placed outside the rotor in a radial direction of the rotor, and having multiple metal plates which are piled up in a direction of the axis-of-rotation line and which include a first metal plate and a second metal plate; a conductive part pair including a first conductive part placed on an outer surface in the radial direction of the stator, having conductivity, and connecting the first and second metal plates, and a second conductive part placed at a position different from that of the first conductive part on the outer surface of the stator, having conductivity, and connecting the first and second metal plates; a position sensor to detect a rotational position of the rotor; and a signal wire placed over the first and second metal plates in such a way as to be adjacent to the outer surface, to transmit an output signal of the position sensor, in which the first and second conductive parts are arranged in such a way as to sandwich the signal wire between the first and second conductive parts when viewed from the radial direction.

Advantageous Effects of Invention

According to the present disclosure, because when a leakage magnetic flux changes in the stator, an eddy current in a direction of reducing a change in the leakage magnetic flux occurs in a closed circuit formed by the first and second metal plates, and the first and second conductive parts, the influence of the leakage magnetic flux can be reduced.

DESCRIPTION OF EMBODIMENTS

Figure 1:
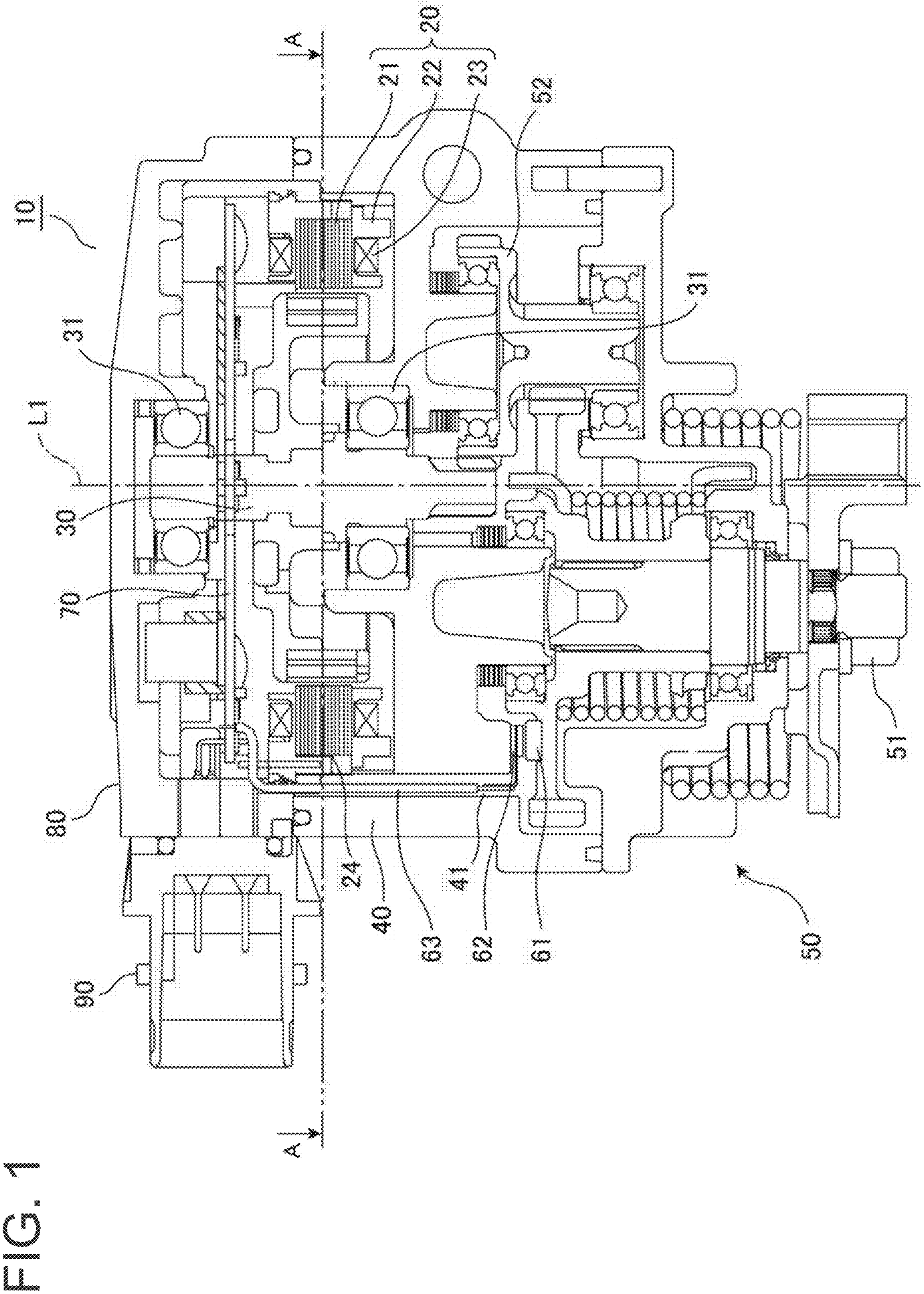
FIG. 1 is a cross-sectional view showing the configuration of an electric motor according to Embodiment 1.

Hereinafter, the embodiments of the present disclosure will be explained in detail while referring to the drawings.

Embodiment 1

First, a schematic configuration of an electric motor 10 according to Embodiment 1 will be explained while referring to FIG. 1. FIG. 1 is a cross-sectional view showing the configuration of the electric motor 10 according to Embodiment 1. The electric motor 10 includes: a rotor 30 to rotate about an axis-of-rotation line L1; bearings 31 and 31 to rotatably support the rotor 30; a stator 20 placed outside the rotor 30 in a radial direction of the rotor 30; a housing 40 to hold the stator 20; a mechanism part 50 to which a rotatory force of the rotor 30 is transferred; a position sensor 62 to detect the rotational position of the rotor 30; a circuit board 70; a sensor wire 63 connecting the position sensor 62 and the circuit board 70; a cover 80 held by the housing 40, to cover the circuit board 70; and a connector 90 connected to the circuit board 70.

The rotor 30 has permanent magnets (not illustrated). The rotor 30 may be a surface permanent magnetic (SPM) one in which permanent magnets are arranged around an outer periphery of the rotor 30, or an interior permanent magnet (IPM) one in which permanent magnets are arranged inside the rotor. In Embodiment 1, the rotor 30 configures a rotor.

One of the bearings 31 and 31 supports an end side of the rotor 30, and the other one of the bearings supports another end side of the rotor 30. For example, one bearing 31 is held by the cover 80, and the other bearing 31 is held by the housing 40.

The circuit board 70 is placed on a side of the stator 20 in a direction of the axis-of-rotation line L1, and is held by the cover 80. The circuit board 70 has a function as a drive circuit to supply a current to the stator 20. For example, the circuit board 70 supplies a current for controlling the rotation of the rotor 30 to the stator 20 on the basis of an output signal from the position sensor 62.

The stator 20, as an armature, has a stator core 21 which is configured by piling up multiple metal plates in a direction of the axis-of-rotation line L1, multiple bobbins 22 each of which is formed of a synthetic resin, and multiple coils 23. The stator 20 is connected via a not-illustrated electric wire to the circuit board 70, and is magnetized in response to the supply of the current from the circuit board 70, to cause the rotor 30 to rotate. In Embodiment 1, the stator 20 configures a stator.

While the housing 40 holds each component, the housing 40 covers the components arranged inside to protect them. Concretely, the housing 40 covers the rotor 30, the stator 20, and the sensor wire 63 to protect them. Further, the housing 40 is formed of a material having conductivity. For example, the housing 40 is formed of a material having conductivity different from that of the stator core 21. Concretely, the housing 40 is formed of a material having conductivity higher than that of the stator core 21. More concretely, the housing 40 is formed of aluminum or aluminum alloy.

The mechanism part 50 has a middle gear 52 to which a rotatory force of the rotor 30 is transferred, and an output gear 51 to which a rotatory force of the middle gear 52 is transferred and which slows down and outputs the rotation of the rotor 30, and functions as a deceleration mechanism to slow down the rotation of the rotor 30. An end of the output gear 51 is exposed to outside the electric motor 10 and is joined to an external device, thereby driving the external device. The middle gear 52 and the output gear 51 may be directly supported by the housing 40, or may be indirectly held via another part by the housing 40. In Embodiment 1, the output gear 51 configures a deceleration rotation part.

The position sensor 62 is held by the housing 40, for example. The position sensor 62 directly or indirectly detects the rotational position of the rotor 30. For example, the position sensor 62 indirectly detects the rotational position of the rotor 30 by detecting the rotational position of the output gear 51. Concretely, the position sensor 62 detects the rotational position of the output gear 51 by detecting a movement of a portion to be detected 61 provided for the output gear 51. More concretely, the position sensor 62 is configured by a Hall integrated circuit (Hall IC), and detects the rotational position of the output gear 51 by detecting a change in a magnetic flux, the change being caused by a movement of a permanent magnet as the portion to be detected 61 provided for the output gear 51. The position sensor 62 outputs a signal corresponding to a result of the detection.

The sensor wire 63 which connects the position sensor 62 and the circuit board 70 is a multicore electric wire configured by multiple electric wires including a power source wire for supplying a current from the circuit board 70 to the position sensor 62, a ground wire, and a signal wire for transmitting the output signal from the position sensor 62 to the circuit board 70. The sensor wire 63 is placed to extend from a side of the stator 20 to another side of the stator 20, in a direction of the axis-of-rotation line L1. Further, the sensor wire 63 is placed between the housing 40 and the stator 20 in such a way as to be adjacent to an outer surface of the stator core 21. For example, the sensor wire 63 is accommodated in a wiring gutter 41 which is formed in the housing 40 in such a way as to face the stator 20 and extend along the axis-of-rotation line L1. The position in a circumferential direction E (refer to FIG. 2) of the sensor wire 63 with respect to the stator core 21 is limited by the wiring gutter 41. In other words, the position in the circumferential direction E (refer to FIG. 2) of the sensor wire 63 with respect to a conductive part pair 24 which will be mentioned later is limited by the wiring gutter 41. The circumferential direction E intersects a direction of the axis-of-rotation line L1, and the radial direction of the rotor 30 (a radial direction of the stator 20). Further, in Embodiment 1, the wiring gutter 41 configures a limiting part. Further, the sensor wire 63 is not limited to the ones which directly connect the position sensor 62 and the circuit board 70, and may connect the position sensor 62 and the circuit board 70 via a terminal provided for the stator 20, the housing 40, the cover 80, or the like, for example.

In general, when the rotor rotates, a leakage magnetic flux leaking outside occurs from the stator. In the electric motor 10 according to Embodiment 1, by providing conductive parts connecting each electromagnetic steel plate of the stator core 21, a noise occurring in the sensor wire 63 because of the leakage magnetic flux is prevented. Hereinafter, a configuration for reducing the influence of the leakage magnetic flux will be explained while referring to FIGS. 2 to 4.

Figure 2:
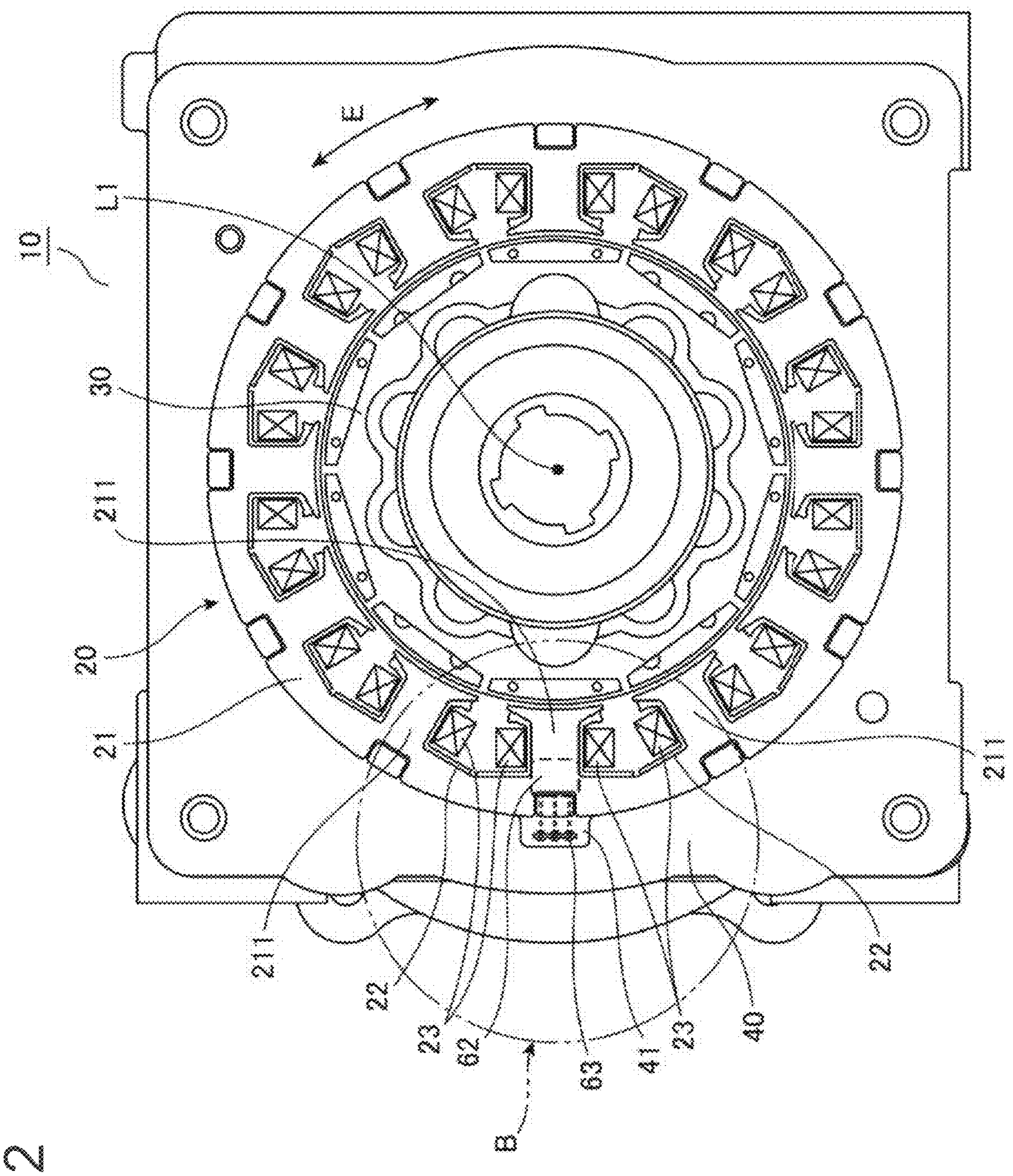
FIG. 2 is a cross-sectional view, taken along the A-A line of FIG. 1, showing the configuration of the electric motor according to Embodiment 1.

FIG. 2 is a cross-sectional view, taken along the line A-A of FIG. 1, showing the configuration of the electric motor 10 according to Embodiment 1. As shown in FIG. 2, the stator core 21 has multiple magnetic poles 211 which are arranged in such a way that their positions in the circumferential direction E differ from one another. The multiple bobbins 22 are arranged in such a way as to cover the individual multiple magnetic poles 211. Further, multiple coils 23 are each arranged in a corresponding one of the multiple bobbins 22, and are each configured by a metal wire which is wound multiple times around the corresponding one of bobbin 22.

When currents are supplied to the coils 23 in order to rotate the rotor 30, a magnetic flux occurs in the stator core 21, and a part of the magnetic flux may leak out, as a leakage magnetic flux, to space outside the stator core 21. For example, in the case where the thickness of the stator core 21 is not uniform and in the case where the currents supplied to the coils 23 are large, a leakage magnetic flux occurs easily. In general, a leakage magnetic flux tends to strongly occur at the positions of the magnetic poles of the stator.

Figure 3:
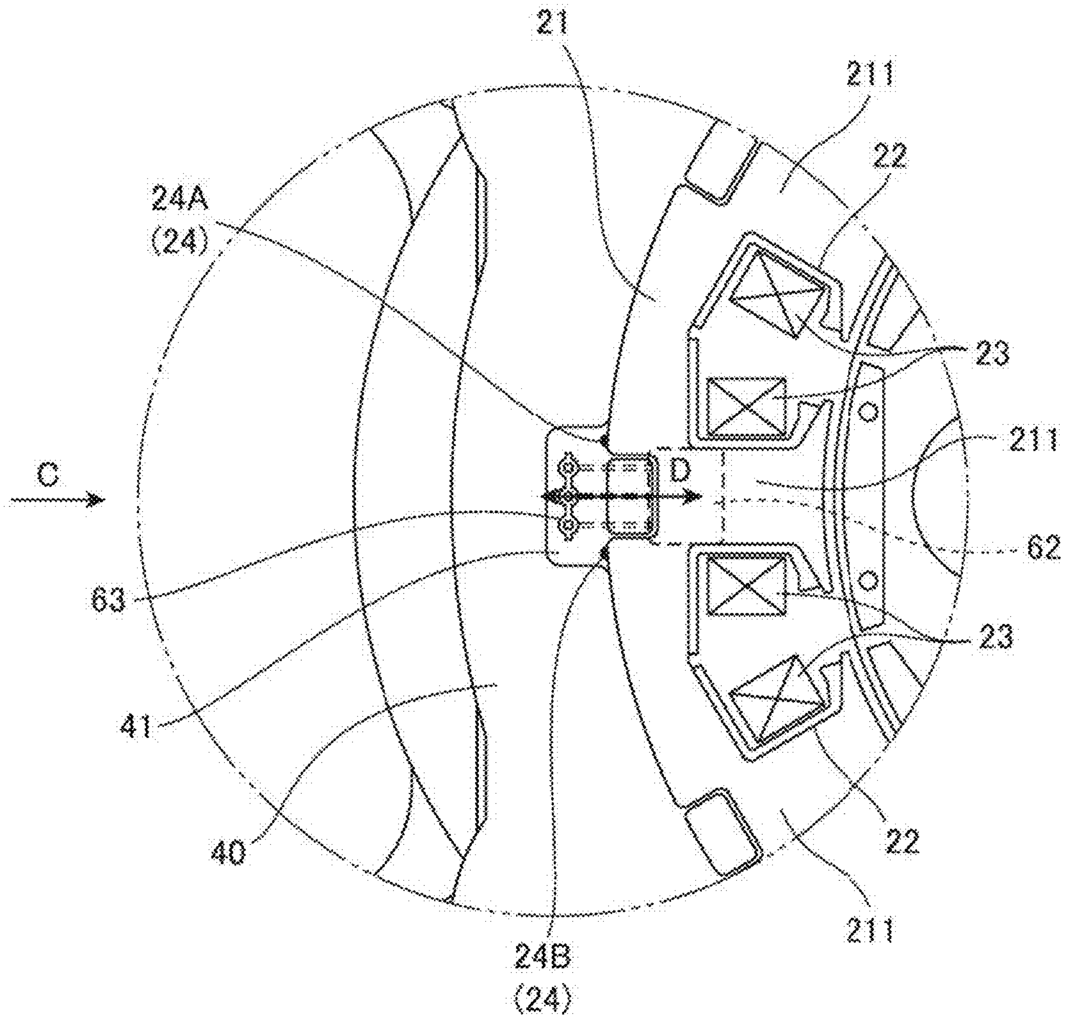
FIG. 3 is an enlarged view of FIG. 2 showing the configuration of the electric motor according to Embodiment 1.
Figure 4A:
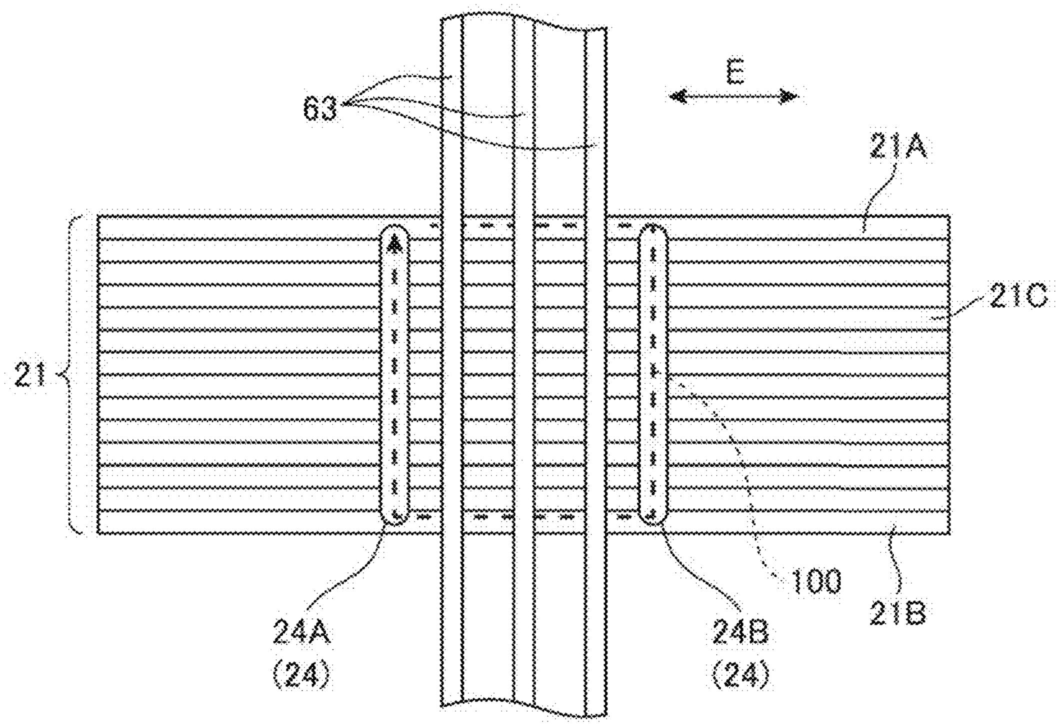
FIG. 4A is a view on arrow showing the configuration of the electric motor according to Embodiment 1, when viewed from a direction C of FIG. 3.

FIG. 3 is an enlarged view D of FIG. 2, showing the configuration of the electric motor 10 according to Embodiment 1, and FIG. 4A is a view on arrow showing the configuration of the electric motor 10 according to Embodiment 1, when viewed from a direction C of FIG. 3. As shown in FIGS. 3 and 4A, the electric motor 10 according to Embodiment 1 includes the conductive part pair 24 which is configured by the first and second conductive parts 24A and 24B which are arranged on the outer surface in the radial direction of the stator core 21 in such a way as to extend from a metal plate 21A at an end of the axis-of-rotation line L1 to a metal plate 21B at the other end of the axis-of-rotation line L1. Each of the first and second conductive parts 24A and 24B has conductivity, and is electrically connected to all the metal plates which make up the stator core 21. For example, the first and second conductive parts 24A and 24B are formed of welding beads. In Embodiment 1, the metal plate 21A configures a first metal plate, the metal plate 21B configures a second metal plate, and a metal plate 21C which is any one of metal plates placed between the metal plates 21A and 21B configures a third metal plate.

The first and second conductive parts 24A and 24B are arranged at mutually-different positions in the circumferential direction E. For example, the first and second conductive parts 24A and 24B are arranged at mutually-different positions in the circumferential direction E along a direction of the axis-of-rotation line L1. In Embodiment 1, the position at which the first conductive part 24A is placed is also referred to as the first position, and the position at which the second conductive part 24B is placed is also referred to as the second position. Further, the first and second conductive parts 24A and 24B are arranged in such a way as to sandwich the sensor wire 63 therebetween when viewed from the direction C which is a radial direction. In other words, the position of the sensor wire 63 in the circumferential direction E is limited in such a way that the sensor wire 63 passes between the first and second conductive parts 24A and 24B when viewed from the radial direction.

As shown in FIG. 4A, a closed circuit 100 through which a current flows is formed on the outer surface of the stator core 21 by the first and second conductive parts 24A and 24B, and the metal plates 21A and 21B. For example, when the leakage magnetic flux of the stator 20 changes, an eddy current in a direction of reducing the change in the leakage magnetic flux occurs in the closed circuit 100 in accordance with the Lenz's law. Therefore, the change in the leakage magnetic flux is reduced inside the closed circuit 100 when viewed from the radial direction. As a result, in the electric motor 10 according to Embodiment 1, the influence of the change in the leakage magnetic flux on the sensor wire 63 which is placed in such a way as to be sandwiched between the first and second conductive parts 24A and 24B is reduced, and the noise occurring in the sensor wire 63 is reduced.

Figure 4B:
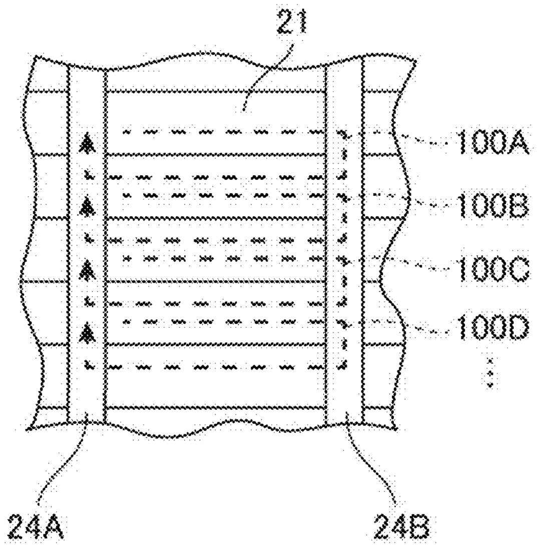
FIG. 4B is a conceptual diagram showing a flow of an eddy current in the electric motor according to Embodiment 1.

The closed circuit in which an eddy current flows is not limited to the one formed of the first and second conductive parts 24A and 24B, the metal plate at an end in a direction of the axis-of-rotation line L1, and the metal plate at the other end in the direction of the axis-of-rotation line L1, and may be one formed of the first and second conductive parts 24A and 24B, and any two metal plates. FIG. 4B is a conceptual diagram showing a flow of eddy currents of the electric motor according to Embodiment 1. For example, in the case where the first and second conductive parts 24A and 24B are electrically connected to all the metal plates of the stator core 21, it can also be considered that multiple closed circuits 100A, 100B, 100C, 100D, and . . . each formed by the first and second conductive parts 24A and 24B and corresponding two adjacent metal plates are formed. In the multiple closed circuits 100A, 100B, 100C, 100D, and . . . as above, eddy currents flowing through the metal plate included in closed circuits adjacent to each other cancel each other out, and, as a result, one closed circuit is formed by the first and second conductive parts 24A and 24B, the metal plate at an end in a direction of the axis-of-rotation line L1, and the metal plate at the other end in the direction of the axis-of-rotation line L1.

As mentioned above, the electric motor 10 according to Embodiment 1 includes the conductive part pair 24 which is configured by the first conductive part 24A placed on the outer surface in the radial direction of the stator core 21, having conductivity, and connecting the metal plates 21A and 21B, and the second conductive part 24B placed at a position different from that of the first conductive part 24A on the outer surface of the stator core 21, having conductivity, and connect the metal plates 21A and 21B. As a result, in the electric motor 10, when the leakage magnetic flux changes in the stator core 21, the influence of the leakage magnetic flux can be reduced because an eddy current in a direction of reducing the change in the leakage magnetic flux occurs in the closed circuit 100 formed by the metal plates 21A and 21B, and the first and second conductive parts 24A and 24B.

Because in the electric motor 10, the change in the leakage magnetic flux from the stator core 21 can be reduced, in the case where, for example, the signal wire for transmitting an output signal from the position sensor 62' for controlling the electric motor 10 is placed in such a way as to be adjacent to the outer surface of the stator core 21 and be sandwiched between the first and second conductive parts 24A and 24B, the noise occurring in the signal wire can be reduced. As a result, it is possible to improve the S/N ratio of the signal transmitted via the signal wire, and it is possible to improve the accuracy at the time of controlling the electric motor 10 on the basis of the signal from the position sensor 62.

Further, in the electric motor 10, the housing 40 which covers the stator 20 is formed of a material having conductivity higher than that of the stator core 21. As a result, in the electric motor 10, because the leakage magnetic flux of relatively low frequency is reduced by the closed circuit 100, and the leakage magnetic flux of relatively high frequency is reduced by an eddy current path formed in the housing 40, the leakage magnetic flux in a wide frequency range can be reduced.

Further, in the electric motor 10, because all the metal plates which make up the stator core 21 are connected by the first and second conductive parts 24A and 24B, it is possible to improve the strength of the stator core 21. Especially in the case where the first and second conductive parts 24A and 24B are formed of welding beads, the advantageous effect of improving the strength is high. Further, generally speaking, in the case where multiple metal plates are piled up to make up the stator core, the metal plates are caused to hold each other by deforming them with caulking, but, when the force for causing the metal plates to hold each other which is provided by the first and second conductive parts 24A and 24B is sufficiently high, it is possible to omit the caulking process, and it is possible to improve the productivity.

In Embodiment 1, although the metal plate 21A as the first metal plate and the metal plate 21B as the second metal plate are the metal plate at an end in a direction of the axis-of-rotation line L1 and the metal plate at the other end in a direction of the axis-of-rotation line L1, respectively, the first and second metal plates are not limited to these examples. The first and second metal plates may be any two metal plates out of the multiple metal plates which the stator core has, and, for example, the first and second metal plates may be two adjacent metal plates out of the multiple metal plates of the stator core, or two metal plates in a central part in a direction of the axis-of-rotation line L1 out of the multiple metal plates of the stator core. Note that, the connection of the metal plate at an end in a direction of the axis-of-rotation line L1 and the metal plate at the other end in a direction of the axis-of-rotation line L1 to the first and second conductive parts makes it possible to further improve the effect of reducing the leakage magnetic flux.

Further, in Embodiment 1, although the first and second conductive parts 24A and 24B are electrically connected to all the metal plates which make up the stator core 21, this embodiment is not limited to this example. The first and second conductive parts have only to be electrically connected to at least any two of the metal plates which make up the stator core, and, for example, the first and second conductive parts may be electrically connected only to the first and second metal plates or only to the first, second and third metal plates. Note that, the electrical connection of the first and second conductive parts to all the metal plates which make up the stator core makes it possible to further improve the effect of reducing the leakage magnetic flux.

Further, although in Embodiment 1, the first and second conductive parts 24A and 24B are arranged in such a way as to sandwich the sensor wire 63 which is a multicore electric wire, when viewed from the radial direction, this embodiment is not limited to this example. The first and second conductive parts have only to be arranged in such a way as to at least sandwich the signal wire which is placed in such a way as to be adjacent to the outer surface of the stator, when viewed from the radial direction, and, for example, in the case where an electric wire which is disposed in such a way as to be adjacent to the outer surface of the stator is a multicore electric wire including the signal wire, one or more electric wires other than the signal wire do not have to be arranged between the first and second conductive parts when viewed from the radial direction, and, in the case where electric wires which are arranged in such a way as to be adjacent to the outer surface of the stator are arranged at multiple locations, one or more electric wires not including the signal wire do not have to be arranged between the first and second conductive parts. Note that, because the current value changes when any electric wire other than the signal wire, e.g. the power source wire is also affected by the leakage magnetic flux, it is desirable that any electric wire which is placed in such a way as to be adjacent to the outer surface of the stator is disposed between the first and second conductive parts when viewed from the radial direction. Therefore, it is preferable that the distance in the circumferential direction between the first and second conductive parts is longer than the sensor wire 63.

Further, when the distance between the first and second conductive parts 24A and 24B is too long, the effect of reducing the leakage magnetic flux deteriorates. Therefore, it is desirable that the distance between the first and second conductive parts 24A and 24B is approximately of a degree of the width in the circumferential direction of one magnetic pole 211. Further, for example, it is desirable that the distance between the first and second conductive parts 24A and 24B is less than or equal to the distance between two mutually-adjacent magnetic poles (in the case where the number of poles is 12, the length of an arc corresponding to 30 degrees of the outer surface of the stator).

Further, although in Embodiment 1, the first and second conductive parts 24A and 24B are arranged along a direction of the axis-of-rotation line L1, this embodiment is not limited to this example. The first and second conductive parts have only to be arranged at mutually-different positions on the outer surface of the stator in such a way that each of the first and second conductive parts electrically connects the first and second metal plates, and, for example, the first and second conductive parts do not have to be parallel to each other, and do not have to be formed in such a way as to have a linear shape.

Further, although in Embodiment 1, the first and second conductive parts 24A and 24B are formed of welding beads, this embodiment is not limited to this example. The first and second conductive parts have only to be able to electrically connect the first and second metal plates, and, for example, the first and second conductive parts may be formed of parts having conductivity, such as metal wires, metallic foils, or metal rods, or the first and second conductive parts may be formed by melting the first and second metal plates by welding. Further, in the case where the first and second conductive parts are formed by welding, the electric motor 10 is produced using a producing method including: a step of piling up the multiple metal plates including the first and second metal plates in a direction of the axis-of-rotation line L1; a step of connecting the first and second metal plates by welding at the first position on the outer surface in the radial direction of the stator; and a step of connecting the first and second metal plates by welding at the second position different from the first position on the outer surface in the radial direction of the stator.

Further, although in Embodiment 1, the position sensor 62 is configured by means of a Hall IC in such a way as to detect the position of the permanent magnet, as the portion to be detected 61, which is provided for the output gear 51, this embodiment is not limited to this example. For example, the position sensor may be a resolver sensor which has a coil to generate a magnetic flux when a current is supplied thereto, the portion to be detected being configured by a yoke formed of a conductor, and which detects the rotational position of the rotor by detecting a change in the magnetic flux generated by the coil, the change being caused by a movement of the yoke within the magnetic field excited by the coil. For example, such a yoke has a periodic shape change in such a way as to be relative to an angle or a position. In Embodiment 1, such a yoke configures a conductive member.

Further, the position sensor may be an optical encoder which has a light source and an optical receiving element, and which detects the rotational position of a disk as the portion to be detected, and various configurations can be considered as the configuration of the position sensor. Further, the position sensor may be configured in such a way as to directly detect the rotational position of the rotor. For example, the position sensor may be configured in such a way as to directly detect a change in the position of a permanent magnet, as the portion to be detected, which is provided for an end of a shaft of the rotor. Further, the position sensor may have a function of the portion to be detected, or the portion to be detected may have a function of the position sensor.

Embodiment 2

Next, an electric motor 10 according to Embodiment 2 will be explained while referring to FIG. 5. When comparing with the electric motor 10 according to Embodiment 1, the electric motor 10 according to Embodiment 2 differs from that according to Embodiment 1 in the configuration of a mechanism part 50, but is the same as that according to Embodiment 1 in the other components, and the explanation of the same components as those of Embodiment 1 will be omitted by assigning the same reference signs to the components.

Figure 5:
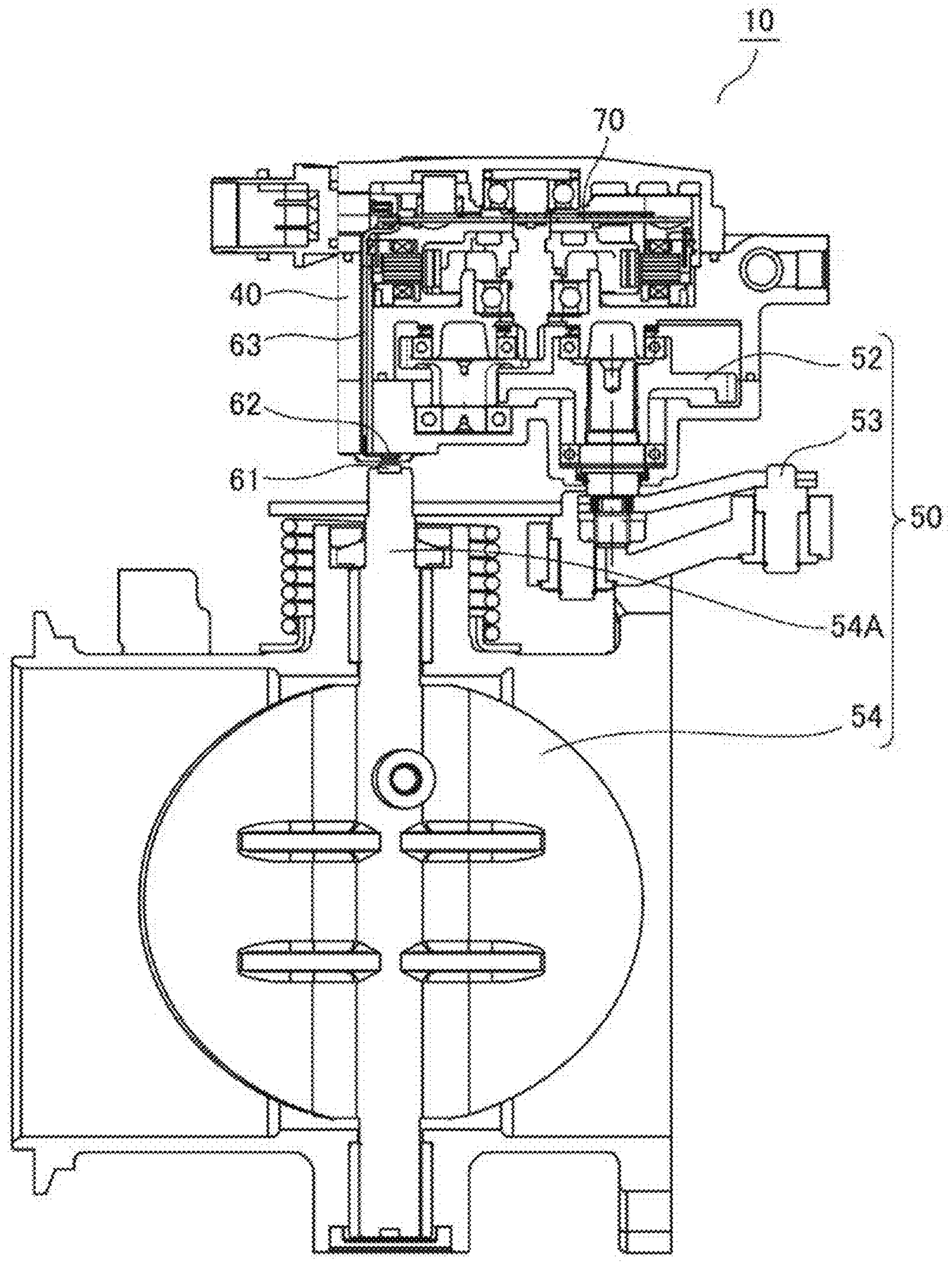
FIG. 5 is a cross-sectional view showing the configuration of an electric motor according to Embodiment 2.

FIG. 5 is a cross-sectional view showing the configuration of the electric motor 10 according to Embodiment 2. The mechanism part 50 of the electric motor 10 according to Embodiment 2 has a middle gear 52 for slowing down the rotation of a rotor 30, a linkage mechanism 53 which has multiple levers and bushes, and which converts and outputs the rotation of the rotor 30, and a butterfly-shaped valve 54 which controls the amount of flow and the pressure of a liquid in a flow channel. The mechanism part 50 according to Embodiment 2 has a portion to be detected 61 which is placed at a position in an end of a shaft of rotation 54A of the butterfly-shaped valve 54 and opposite to a position sensor 62. The position sensor 62 detects the rotational position of the shaft of rotation 54A, and outputs an output signal corresponding to a result of the detection to a circuit board 70. The circuit board 70 supplies a current for rotating the rotor 30 to a stator 20 on the basis of the output signal from the position sensor 62. As a result, the electric motor 10 according to Embodiment 2 controls the amount of flow of and the pressure of the liquid in the flow channel by means of the butterfly-shaped valve 54.

Embodiment 3

Next, an electric motor 10 according to Embodiment 3 will be explained while referring to FIG. 6. When comparing with the electric motor 10 according to Embodiment 1, the electric motor 10 according to Embodiment 3 differs from that according to Embodiment 1 in the configuration of a stator 20 and the arrangement of conductive part pairs 24, but is the same as that according to Embodiment 1 in the other components, and the explanation of the same components as those of Embodiment 1 will be omitted by assigning the same reference signs to the components.

Figure 6:
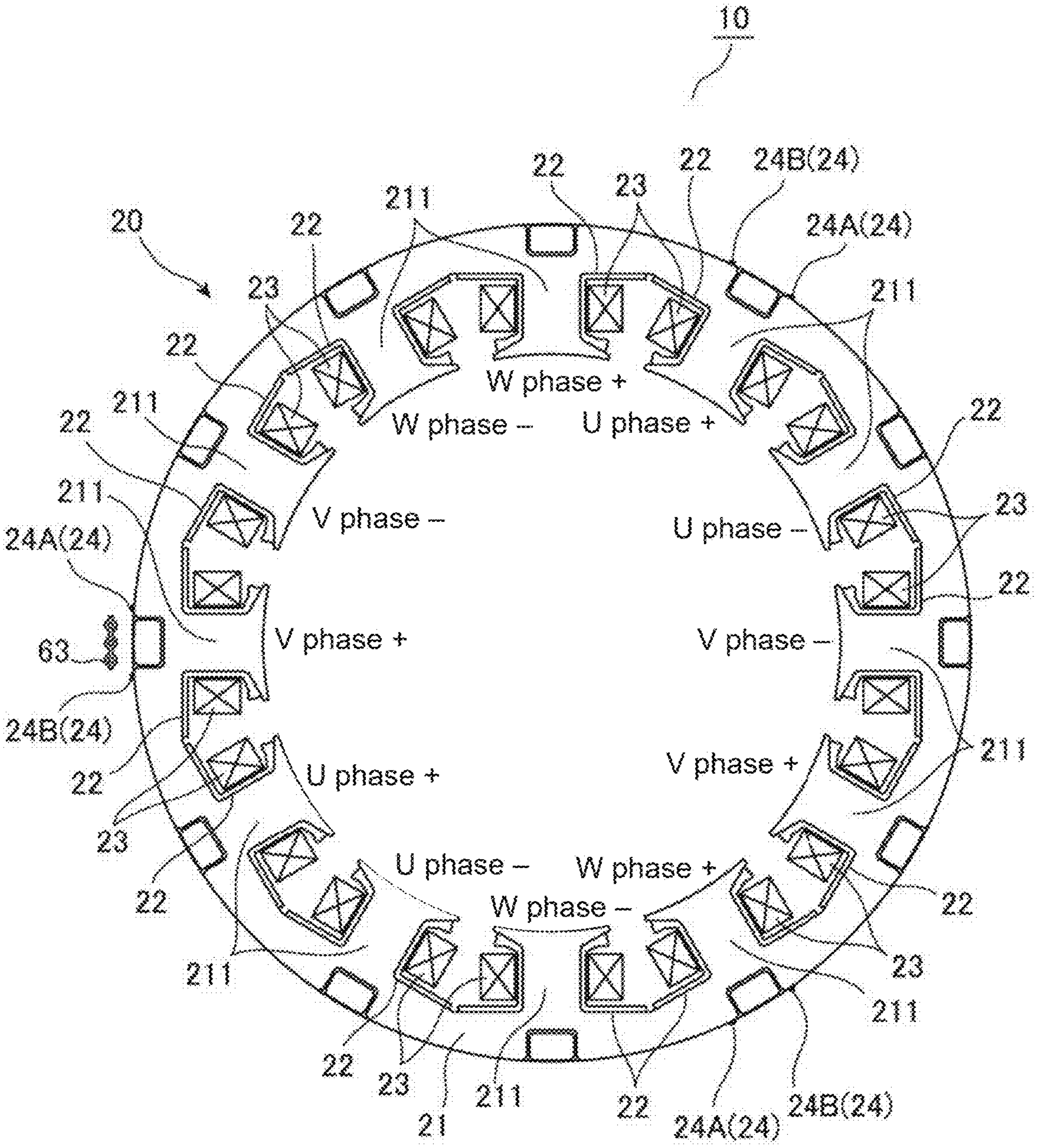
FIG. 6 is a cross-sectional view showing the configuration of an electric motor according to Embodiment 3.

FIG. 6 is a cross-sectional view showing the configuration of the electric motor 10 according to Embodiment 3. As shown in FIG. 6, the electric motor 10 according to Embodiment 3 has multiple conductive part pairs 24 arranged at mutually-different positions in a circumferential direction on an outer surface in a radial direction of a stator 20. Concretely, the electric motor 10 has three conductive part pairs 24 arranged at positions which are rotationally symmetric when viewed from a direction of an axis-of-rotation line L1, on the outer surface in the radial direction of the stator 20. A sensor wire 63 is disposed in such a way as to be sandwiched between a first conductive part 24A and a second conductive part 24B which are included in one conductive part pair 24 out of those multiple conductive part pairs 24.

Further, the stator 20 of the electric motor 10 according to Embodiment 3 has multiple magnetic poles 211 which are arranged at mutually-different positions in the circumferential direction. Concretely, the stator 20 of the electric motor 10 has twelve magnetic poles 211 arranged at positions which are rotationally symmetric when viewed from a direction of the axis-of-rotation line L1. The electric motor 10 according to Embodiment 3 includes the three-phase drive stator 20 in which a U phase, a V phase, and a W phase are formed by those twelve magnetic poles 211. In addition, each of the signs "+" and "−" shown in FIG. 6 shows the direction around which a coil is wound, i.e. a relative relationship of the direction in which a magnetic flux occurs when a current is made to flow.

Further, in the electric motor 10 according to Embodiment 3, the number of conductive part pairs 24 arranged on the outer surface in the radial direction of the stator 20 is equal to the number of phases of the stator 20. Further, the multiple conductive part pairs 24 arranged on the outer surface in the radial direction of the stator 20 are arranged at positions corresponding to the multiple magnetic poles 211 of the stator 20. For example, each of the conductive part pair 24 is placed at a position where an intermediate part between the first and second conductive parts 24A and 24B overlaps a corresponding magnetic pole 211 with respect to the radial direction.

When a closed circuit 100 (refer to FIG. 4A) is formed by a conductive part pair 24 and an eddy current occurs in the closed circuit 100, this eddy current slightly influences the magnetic flux which the stator 20 generates in order to rotate the rotor 30. Therefore, in case that only a closed circuit 100 is placed at one location, nonuniformity in the circumferential direction and nonuniformity between phases occur in the magnetic flux generated by the stator 20, and this can become a cause of a current ripple and a torque ripple.

In the electric motor 10 according to Embodiment 3, the multiple conductive part pairs 24 are arranged at positions which are rotationally symmetric when viewed from a direction of the axis-of-rotation line L1 and which correspond to the multiple magnetic poles 211. As a result, the electric motor 10 can reduce the nonuniformity in the circumferential direction and the nonuniformity between phases in the magnetic flux generated by the stator 20, and prevent a current ripple and a torque ripple.

Although in Embodiment 3, the electric motor 10 has the three conductive part pairs 24 arranged at positions which are rotationally symmetric when viewed from a direction of the axis-of-rotation line L1, this embodiment is not limited to this example. The electric motor has only to have multiple conductor pairs arranged at positions which are rotationally symmetric when viewed from a direction of the axis-of-rotation line L1, and may have two conductor pairs arranged at positions which are rotationally symmetric when viewed from a direction of the axis-of-rotation line L1, or may have conductor pairs which are arranged at positions which are rotationally symmetric when viewed from a direction of the axis-of-rotation line L1, and the number of which is an integral multiple of the number of phases. Instead, the electric motor may have conductor pairs which are arranged at positions which are rotationally symmetric when viewed from a direction of the axis-of-rotation line L1, and the number of which is equal to the number of poles, or may have conductor pairs which are arranged at positions which are rotationally symmetric when viewed from a direction of the axis-of-rotation line L1, and the number of which is an integral submultiple of the number of poles.

In FIG. 6, although the sensor wire 63 is placed in such a way as to face a magnetic pole 211 of "V phase+", this embodiment is not limited to this example. Although the sensor wire may be placed in such a way as to face another magnetic pole or may be placed between two adjacent magnetic poles, the case in which the sensor wire is placed in an intermediate part between magnetic poles of the same phase, e.g. an intermediate part between the magnetic pole of "V phase+" and a magnetic pole of "V phase−" provides a higher effect of reducing a leakage magnetic flux than the case in which the sensor wire is placed in an intermediate part between magnetic poles of mutually different phases, e.g. an intermediate part between the magnetic pole of "V phase+" and a magnetic pole of "U phase+."

Also in any of the above-mentioned embodiments, the configuration of the mechanism part is not limited to the above-mentioned examples, and, as the configuration capable of transferring the rotatory force of the rotor, another deceleration mechanism, another linkage mechanism, a ball screw, a rack-and-pinion, or the like may be included or two or more of these components may be included, and various configurations can be considered as the configuration of the mechanism part. Further, the operation outputted from the electric motor is not limited to the rotational operation and may be a reciprocation operation, and various operations can be considered. Further, the position sensor may directly detect the rotational position of the rotor, or indirectly detect either the rotational position or the number of rotations of the rotor by detecting the position of one of the components of the mechanism part which moves depending on the rotor.

It is to be understood that any combination of two or more of the above-mentioned embodiments can be made, various changes can be made in any component according to any one of the above-mentioned embodiments, or any component according to any one of the above-mentioned embodiments can be omitted within the scope of the present disclosure.

INDUSTRIAL APPLICABILITY

The electric motor according to the present disclosure can be used for, for example, a reduction in a noise occurring in an electric wire extending outside a stator. Hereinafter, various aspects of the present disclosure are collectively described as additional notes.

(Additional Note 1)

An electric motor including:

a rotor to rotate about an axis-of-rotation line;

a stator placed outside the rotor in a radial direction of the rotor, and having multiple metal plates which are piled up in a direction of the axis-of-rotation line and which include a first metal plate and a second metal plate; and a conductive part pair including a first conductive part placed on an outer surface in the radial direction of the stator, having conductivity, and connecting the first and second metal plates, and a second conductive part placed at a position different from that of the first conductive part on the outer surface, having conductivity, and connecting the first and second metal plates.

(Additional Note 2)

The electric motor described in Additional Note 1, in which the multiple metal plates include a third metal plate placed between the first and second metal plates, and the first and second conductive parts are connected to the third metal plate.

(Additional Note 3)

The electric motor described in Additional Note 1 or 2, including:

a position sensor to detect a rotational position of the rotor; and a signal wire placed over the first and second metal plates in such a way as to be adjacent to the outer surface, to transmit an output signal of the position sensor, in which the first and second conductive parts are arranged in such a way as to sandwich the signal wire between the first and second conductive parts when viewed from the radial direction.

(Additional Note 4)

The electric motor described in Additional Note 3, including a multicore electric wire made up of multiple electric wires including the signal wire, in which the first and second conductive parts are arranged in such a way as to sandwich the multicore electric wire between the first and second conductive parts when viewed from the radial direction.

(Additional Note 5)

The electric motor described in Additional Note 3, including a portion to be detected to move on a basis of a rotation of the rotor, in which the position sensor detects the rotational position of the rotor by detecting a movement of the portion to be detected.

(Additional Note 6)

The electric motor described in Additional Note 5, in which the portion to be detected is configured by a permanent magnet, and in which the position sensor detects the rotational position of the rotor by detecting a change in a magnetic flux, the change being caused by the movement of the portion to be detected.

(Additional Note 7)

The electric motor described in Additional Note 5, in which the portion to be detected is configured by a conductive member, and in which the position sensor has a coil to generate a magnetic flux when a current is supplied to, and detects the rotational position of the rotor by detecting a change in the magnetic flux, the change being caused by a movement of the conductive member.

(Additional Note 8)

The electric motor described in any one of Additional Notes 5 to 7, including a deceleration mechanism having a deceleration rotation unit to slow down and output the rotation of the rotor.

(Additional Note 9)

The electric motor described in any one of Additional Notes 5 to 7, including a linkage mechanism to convert and output the rotation of the rotor.

(Additional Note 10)

The electric motor described in any one of Additional Notes 5 to 9, in which the portion to be detected is placed on the rotor.

(Additional Note 11)

The electric motor described in Additional Note 8, in which the portion to be detected is placed on the deceleration rotation unit.

(Additional Note 12)

The electric motor described in Additional Note 3, including a housing to cover the signal wire, the rotor, and the stator.

(Additional Note 13)

The electric motor described in Additional Note 12, in which the housing is formed of a material having conductivity.

(Additional Note 14)

The electric motor described in Additional Note 12 or 13, in which the housing is formed of a material having conductivity different from that of the multiple metal plates.

(Additional Note 15)

The electric motor described in any one of Additional Notes 12 to 14, in which the housing has a limiting part to limit a position of the signal wire with respect to the conductive part pair.

(Additional Note 16)

The electric motor described in any one of Additional Notes 1 to 15, including multiple conductive part pairs arranged on the outer surface at positions which are rotationally symmetric when viewed from a direction of the axis-of-rotation line.

(Additional Note 17)

The electric motor described in Additional Note 16, in which the stator has multiple magnetic poles arranged at positions which are rotationally symmetric when viewed from a direction of the axis-of-rotation line, and the multiple conductive part pairs are arranged at the positions corresponding to the multiple magnetic poles.

(Additional Note 18)

The electric motor described in any one of Additional Notes 1 to 17, in which the first and second conductive parts are formed of welding beads.

(Additional Note 19)

A method of producing an electric motor including: a rotor to rotate about an axis-of-rotation line; and a stator placed outside the rotor in a radial direction of the rotor, and having multiple metal plates including a first metal plate and a second metal plate, the method including the steps of:

pilling up the multiple metal plates including the first and second metal plates in a direction of the axis-of-rotation line;

connecting the first and second metal plates by welding at a first position on an outer surface in the radial direction of the stator; and connecting the first and second metal plates by welding at a second position different from the first position on the outer surface.

REFERENCE SIGNS LIST

10 electric motor, 20 stator (stator), 21 stator core, 21A metal plate (first metal plate), 21B metal plate (second metal plate), 21C metal plate (third metal plate), 22 bobbin, 23 coil, 24 conductive part pair, 24A first conductive part, 24B second conductive part, 30 rotor (rotor), 31 bearing, 40 housing, 41 wiring gutter (limiting part), 50 mechanism part, 51 output gear (deceleration rotation part), 52 middle gear, 53 linkage mechanism, 54 butterfly-shaped valve, 54A shaft of rotation, 61 portion to be detected (conductive member, permanent magnet), 62 position sensor, 63 sensor wire (multicore electric wire), 70 circuit board, 80 cover, 90 connector, 100, 100A, 100B, 100C, 100D closed circuit, 211 magnetic pole, C direction, E circumferential direction, and L1 axis-of-rotation line.

The invention claimed is:

1. An electric motor comprising:

a rotor to rotate about an axis-of-rotation line;

a stator placed outside the rotor in a radial direction of the rotor, and having multiple metal plates which are piled up in a direction of the axis-of-rotation line and which include a first metal plate and a second metal plate;

a conductive part pair including a first conductive part placed on an outer surface in the radial direction of the stator, having conductivity, and connecting the first and second metal plates, and a second conductive part placed at a position different from that of the first conductive part on the outer surface, having conductivity, and connecting the first and second metal plates;

a position sensor to detect a rotational position of the rotor; and a signal wire placed over the first and second metal plates in such a way as to be adjacent to the outer surface, to transmit an output signal of the position sensor, wherein the first and second conductive parts are arranged in such a way as to sandwich the signal wire between the first and second conductive parts when viewed from the radial direction.

2. The electric motor according to claim 1, wherein the multiple metal plates include a third metal plate placed between the first and second metal plates, and the first and second conductive parts are connected to the third metal plate.

3. The electric motor according to claim 2, comprising a multicore electric wire made up of multiple electric wires including the signal wire, wherein the first and second conductive parts are arranged in such a way as to sandwich the multicore electric wire between the first and second conductive parts when viewed from the radial direction.

4. The electric motor according to claim 2, comprising a portion to be detected to move on a basis of a rotation of the rotor, wherein the position sensor detects the rotational position of the rotor by detecting a movement of the portion to be detected.

5. The electric motor according to claim 4, wherein the portion to be detected is configured by a permanent magnet, and wherein the position sensor detects the rotational position of the rotor by detecting a change in a magnetic flux, the change being caused by the movement of the portion to be detected.

6. The electric motor according to claim 4, wherein the portion to be detected is configured by a conductive member, and wherein the position sensor has a coil to generate a magnetic flux when a current is supplied to, and detects the rotational position of the rotor by detecting a change in the magnetic flux, the change being caused by a movement of the conductive member.

7. The electric motor according to claim 4, comprising a deceleration mechanism having a deceleration rotation part to slow down and output the rotation of the rotor.

8. The electric motor according to claim 4, wherein the electric motor comprises a linkage mechanism to convert and output the rotation of the rotor.

9. The electric motor according to claim 4, wherein the portion to be detected is placed on the rotor.

10. The electric motor according to claim 7, wherein the portion to be detected is placed on the deceleration rotation part.

11. The electric motor according to claim 2, comprising a housing to cover the signal wire, the rotor, and the stator.

12. The electric motor according to claim 11, wherein the housing is formed of a material having conductivity.

13. The electric motor according to claim 12, wherein the housing is formed of the material having conductivity different from that of the multiple metal plates.

14. The electric motor according to claim 11, wherein the housing has a limiting part to limit a position of the signal wire with respect to the conductive part pair.

15. The electric motor according to claim 1, comprising multiple conductive part pairs arranged on the outer surface at positions which are rotationally symmetric when viewed from a direction of the axis-of-rotation line.

16. The electric motor according to claim 15, wherein the stator has multiple magnetic poles arranged at positions which are rotationally symmetric when viewed from a direction of the axis-of-rotation line, and the multiple conductive part pairs are arranged at the positions corresponding to the multiple magnetic poles.

17. The electric motor according to claim 1, wherein the first and second conductive parts are formed of welding beads.

18. A method of producing an electric motor including: a rotor to rotate about an axis-of-rotation line; and a stator placed outside the rotor in a radial direction of the rotor, and having multiple metal plates including a first metal plate and a second metal plate, a position sensor to detect a rotational position of the rotor; and a signal wire to transmit an output signal of the position sensor, the method comprising:

piling up the multiple metal plates including the first and second metal plates in a direction of the axis-of-rotation line;

forming a first conductive part which has conductivity and connects the first and second metal plates, by welding the first and second metal plates at a first position on an outer surface in the radial direction of the stator; and forming a second conductive part which has conductivity and connects the first and second metal plates, by welding the first and second metal plates at a second position different from the first position on the outer surface, wherein the signal wire is placed over the first and second metal plates in such a way as to be adjacent to the outer surface, and wherein the first and second conductive parts are arranged in such a way as to sandwich the signal wire between the first and second conductive parts when viewed from the radial direction.

* * * * *